(12) United States Patent
Ip et al.

(10) Patent No.: US 8,873,971 B2
(45) Date of Patent: Oct. 28, 2014

(54) NONLINEAR COMPENSATION USING AN ENHANCED BACKPROPAGATION METHOD WITH SUBBANDING

(75) Inventors: Ezra Ip, Plainsboro, NJ (US); Neng Bai, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 420 days.

(21) Appl. No.: 13/269,992

(22) Filed: Oct. 10, 2011

(65) Prior Publication Data

US 2012/0263481 A1 Oct. 18, 2012

Related U.S. Application Data

(60) Provisional application No. 61/391,728, filed on Oct. 11, 2010.

(51) Int. Cl.
| | |
|---|---|
| *H04B 10/00* | (2013.01) |
| *H04B 10/2543* | (2013.01) |
| *H04B 10/69* | (2013.01) |
| *H04L 25/03* | (2006.01) |
| *H04L 27/26* | (2006.01) |
| *H04L 27/36* | (2006.01) |

(52) U.S. Cl.
CPC ........ *H04B 10/2543* (2013.01); *H04B 10/6971* (2013.01); *H04L 25/03159* (2013.01); *H04L 25/03343* (2013.01); *H04L 27/2697* (2013.01); *H04L 27/367* (2013.01); *H04B 2210/252* (2013.01); *H04B 2210/254* (2013.01); *H04L 2025/03687* (2013.01)
USPC .......................................... 398/193; 398/182

(58) Field of Classification Search
USPC .................................................. 398/182, 193
See application file for complete search history.

(56) References Cited

U.S. PATENT DOCUMENTS

2010/0239262 A1* 9/2010 Li et al. .......................... 398/81

OTHER PUBLICATIONS

R. Weidenfeld, M. Nazarathy, R. Noe and I. Shpantzer, "Volterra nonlinear compensation of 112-Gb/s ultra-long-haul coherent optical OFDM based on frequency-shaped decision feedback," *Proc. European Conference. on Opt. Commun.* (ECOC '09), Vienna, Austria, Paper 2.3.3.
R. Weidenfeld, M. Nzarathy, R. Noe and I. Shpantzer, "Volterra nonlinear compensation of 100G coherent OFDM with baud-rate ADC, tolerable complexity and low intra-channel FWM/XPM error propagation," *Proc. Opt. Fiber Commun. Conf.* (OFC '10), San Diego, CA, 2010, Paper OTuE3.
L. B. Du and A. J. Lowery, "Improved single channel backpropagation for intra-channel fiber nonlinearity compensation in long-haul optical communication systems," *Opt. Express*, vol. 18, No. 16, pp. 17075-17088, Aug. 2010.
X. Li, X. Chen, G. Goldfarb, E. Mateo, I. Kim, F. Yaman, and G. Li, "Electronic post-compensation of WDM transmission impairments using coherent detection and digital signal processing," *Opt. Express*, vol. 16, No. 2, pp. 880-888, Jan. 2008.

(Continued)

*Primary Examiner* — Leslie Pascal
(74) *Attorney, Agent, or Firm* — Joseph Kolodka

(57) ABSTRACT

Systems and methods are disclosed to perform nonlinear compensation (NLC) in an optical communication system by applying digital backpropagation (DBP) using a frequency-shaped split-step Fourier method (FS-SSFM), and processing a data block using an overlap-and-save method with a block size M and an overlap factor of N samples between adjacent blocks.

4 Claims, 4 Drawing Sheets

(56) References Cited

OTHER PUBLICATIONS

E. Ip, and J. M. Kahn, "Compensation of dispersion and nonlinear impairments using digital backpropagation," *J. Lightwave Technol.*, vol. 26, No. 20, pp. 3416-3425, Oct. 2008.

A. J. Lowery, "Fiber nonlinearity mitigation in optical links that use OFDM for dispersion compensation," *IEEE Photon. Technol. Lett.*, vol. 19, No. 19, pp. 1556-1558, Oct. 2007.

K.-P. Ho and J. M. Kahn, "Electronic compensation technique to mitigate nonlinear phase noise," *J. Lightw. Technol.*, vol. 22, No. 3, pp. 779-783, Mar. 2004.

K. Kikuchi, M. Fukase, and S. Kim, "Electronic post-compensation for nonlinear phase noise in a 1000-km 20-Gb/s optical QPSK transmission system using the homodyne receiver with digital signal processing," *Proc. Opt. Fiber Commun. Conf.* (OFC 2007), Los Angeles, CA, Paper OTuA2.

\* cited by examiner

NONLINEAR COMPENSATION USING AN ENHANCED BACKPROPAGATION METHOD WITH SUBBANDING

The present application claims priority to Provisional Application Ser. No. 61/391,728 filed Oct. 11, 2010, the content of which is incorporated by reference.

BACKGROUND

The present invention relates to optical transmission techniques. Optical transmission in a fiber is given by the nonlinear Schrödinger equation (NLSE).

$$\frac{\partial E}{\partial z} = (\hat{N} + \hat{D})E \quad (1)$$

where $$\hat{D} = -\frac{1}{2}\alpha - \beta_1 \frac{\partial}{\partial t} - j\beta_2 \frac{1}{2!}\frac{\partial^2}{\partial t^2} + \beta_3 \frac{1}{3!}\frac{\partial^3}{\partial t^3} \text{ and}$$

$$\hat{N} = j\gamma\left[|E|^2 I - \frac{1}{3}(E^H \sigma_3 E)\sigma_3\right]$$

are the linear and nonlinear operators. In the linear operator, $\alpha, \beta_1, \beta_2, \beta_3$ are 2×2 matrices representing attenuation, polarization-mode dispersion, group velocity dispersion and dispersion slope; whereas in the nonlinear operator, $\gamma$ is the fiber's nonlinear parameter.

The noise sources in fiber optic transmission include amplified spontaneous emission (ASE) of inline erbium-doped fiber amplifiers (EDFA), and shot noise and thermal noise of the receiver. For a linear channel, the capacity per bandwidth is given by Shannon's limit: $C = \log_2(1+\eta)$, where $\eta$ is the signal-to-noise ratio (SNR). In the absence of nonlinearity, it is possible to increase capacity by boosting the signal power in order to increase SNR. In optical fiber, however, the variance of signal distortion arising from the Kerr nonlinearity grows faster than SNR. It has been shown that fiber nonlinearity limits the usable signal power, and hence the achievable capacity-distance product. The statistical interaction between signal and in-band noise through fiber nonlinearity ultimately imposes a "nonlinear Shannon's limit" on the achievable capacity. However, nonlinear signal-signal interactions are deterministic, and can be mitigated via nonlinear compensation. Reduction of such deterministic signal distortion at the receiver can improve the capacity-distance product.

In the absence of noise, the signal propagation equation in (1) can be $$\frac{\partial E}{\partial z} = -(\hat{N} + \xi\hat{D})E \quad (2)$$

This operation is analogous to passing the received signal through a fictitious link where each element in the fictitious link exactly inverts the elements of the forward-propagating channel. In the presence of noise however, the inverse NLSE is inexact, leading to irreducible signal distortion from which the nonlinear Shannon's limit arise. All nonlinear compensation (NLC) methods are ultimately based on approximating the inverse NLSE. Depending on the dispersion map, the degree of nonlinearity, the signal modulation format and the spectral characteristics of the signal, different algorithms can be implemented to approximate. Thus, NLC algorithms trade-off between algorithmic-complexity and achievable performance.

Some well-known NLC methods include:

a) Nonlinear signal de-rotation, in which the transmission link is assumed to be a lumped nonlinearity followed by pure dispersion. This technique has been demonstrated in simulations and offline experiments for both single-carrier (SC) and orthogonal frequency-division multiplexed (OFDM) signaling; and its performance depends on the dispersion map being well-managed to keep accumulated dispersion within a symbol where signal power is appreciable.

b) Recently, digital back-propagation (DBP) using the split-step Fourier method (SSFM) has been demonstrated. The SSFM itself is a well-known technique that has been developed for forward propagation, and works by dividing a fiber link into sufficiently small steps such that at the end of each step, the phase rotation in time and frequency due to $\hat{N}$ or $\hat{D}$ is small enough to preserve the accuracy of the final solution.

Unlike nonlinear signal de-rotation, DBP is a universal NLC method and is independent of the modulation format and system dispersion map. DBP can be implemented at the transmitter, at the receiver, or a combination of both transmitter and receiver. In receiver-side DBP, an optical-to-electrical down-converter recovers the electric field in one or both polarizations of the fiber. The electronic signal is sampled with a high-speed analog-to-digital converter (ADC), where a digital signal processor (DSP) computes the inverse NLSE of the digitized waveform. In transmitter-side DBP, the inverse NLSE is calculated by a DSP at the transmitter. The pre-distorted signal is then used to drive optical modulators via arbitrary-waveform generators (AWG).

SUMMARY

Systems and methods are disclosed to perform nonlinear compensation (NLC) in an optical communication system by applying digital back-propagation (DBP) using a frequency-shaped split-step Fourier method (FS-SSFM), and processing a data block using an overlap-and-save method with a block size M and an overlap factor of N samples between adjacent blocks.

Implementations of the above aspect can include one or more of the following. The system includes performing frequency-domain equalization (FDE) on the data block. A fast Fourier transform (FFT) can be done on the data block. The system can multiply the data block with a linear dispersion equalizer, and perform an inverse FFT (IFFT) on the data block. The system includes storing only a portion of the output corresponding to a linear convolution. The dimensions M and N are optimized for a predetermined dispersion map. The system can partition a signal into frequency sub-bands to increase nonlinearity computation accuracy. A multi-step architecture can be used to improve performance. A feed forward structure can be used to reduce error propagation arising from decision errors. an overlap-and-save architecture to support both single-carrier modulation formats and orthogonal frequency-division multiplexing (OFDM) formats.

Pre-filters can be applied before computing nonlinearity. The system can partition nonlinear calculations into B parallel sub-bands. Non-overlapping data blocks can be used to process orthogonal frequency-division multiplexing (OFDM) data. Non-overlapping data blocks can be used to process cyclic prefix coding data. The system can perform DBP at a transmitter, a receiver, or both.

Advantages of the system may include one or more of the following. The system provides enhanced back-propagation algorithm where sub-banding and frequency-shaping by pre- and post-filters are used in the calculation of nonlinearity to enable larger step sizes and reduced algorithmic complexity.

DESCRIPTION

Figure 1:
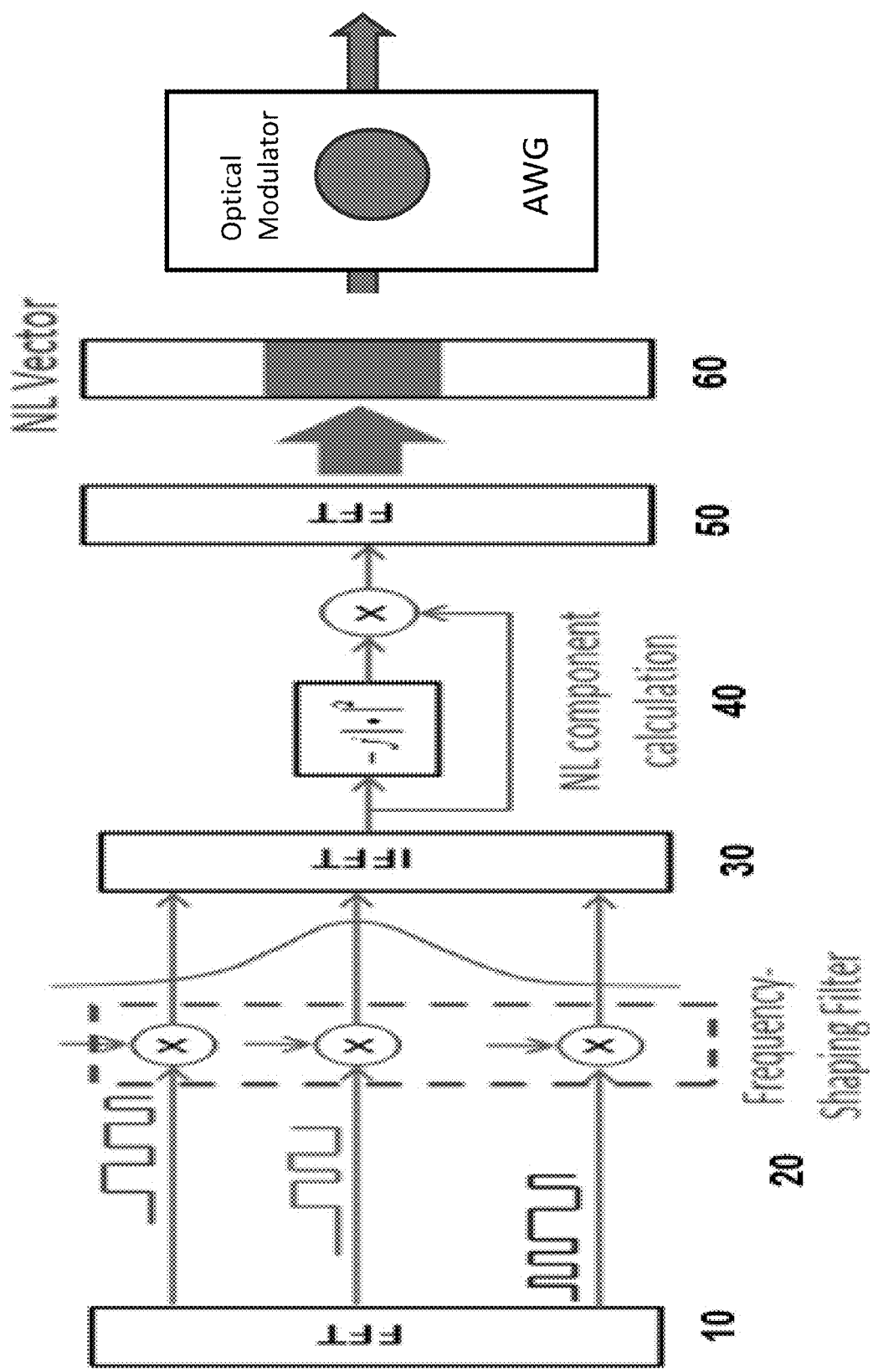
FIG. 1 shows an exemplary walk-off between different frequency components in dispersive fiber which enables frequency-shaping filtering before nonlinear computation.

FIG. 1 shows an exemplary walk-off between different frequency components in dispersive fiber which enables frequency-shaping filtering before nonlinear computation. The traditional SSFM is "frequency-flat": namely, the nonlinear step of the NLSE is solved on a sample-by-sample basis in the time-domain without consideration for walkoff effect between different frequency components of a signal.

In a dispersive fiber, different frequency components of a signal travel at different speeds. From the point of view of a given frequency component, the other frequencies appear to "walkoff," causing an averaging effect on their resulting nonlinear interaction which reduces the variance of the nonlinear distortion.

In FIG. 1, data from a Fast Fourier Transform (FFT) block 10 is provided to frequency shaping filters 20. The result is provided to an inverse FFT (IFFT) block 30, where the data is processed by an NL component calculator 40. The result is provided to an FFT 50 to generate an NL vector 60.

As walkoff increases with frequency separation, the frequencies that lie close to the frequency component of interest will contribute greater nonlinear distortion than the frequencies that are far away. This effect can be exploited by multiplying the signal with a passband pre-filter before calculating the nonlinear operator. The coefficients of this passband pre-filter 20 are optimized so the nonlinearity computed has the highest accuracy over a given frequency band of interest. To estimate the nonlinear distortions at the other frequency bands, the system uses pre-filters that are optimized for the relevant subbands.

In comparison with frequency-flat SSFM, the complexity of frequency-shaped SSFM is increased by a factor of B per step, where B is the total number of sub-bands. But by increasing the accuracy of the nonlinearity computed at each step, the frequency-shaped SSFM (FS-SSFM) algorithm allows larger step sizes compared to standard SSFM. FS-SSFM can yield significant computational advantage for some dispersion maps, as well as provide an additional degree of freedom (number of sub-bands) for which performance can be traded off against complexity.

Figure 2:
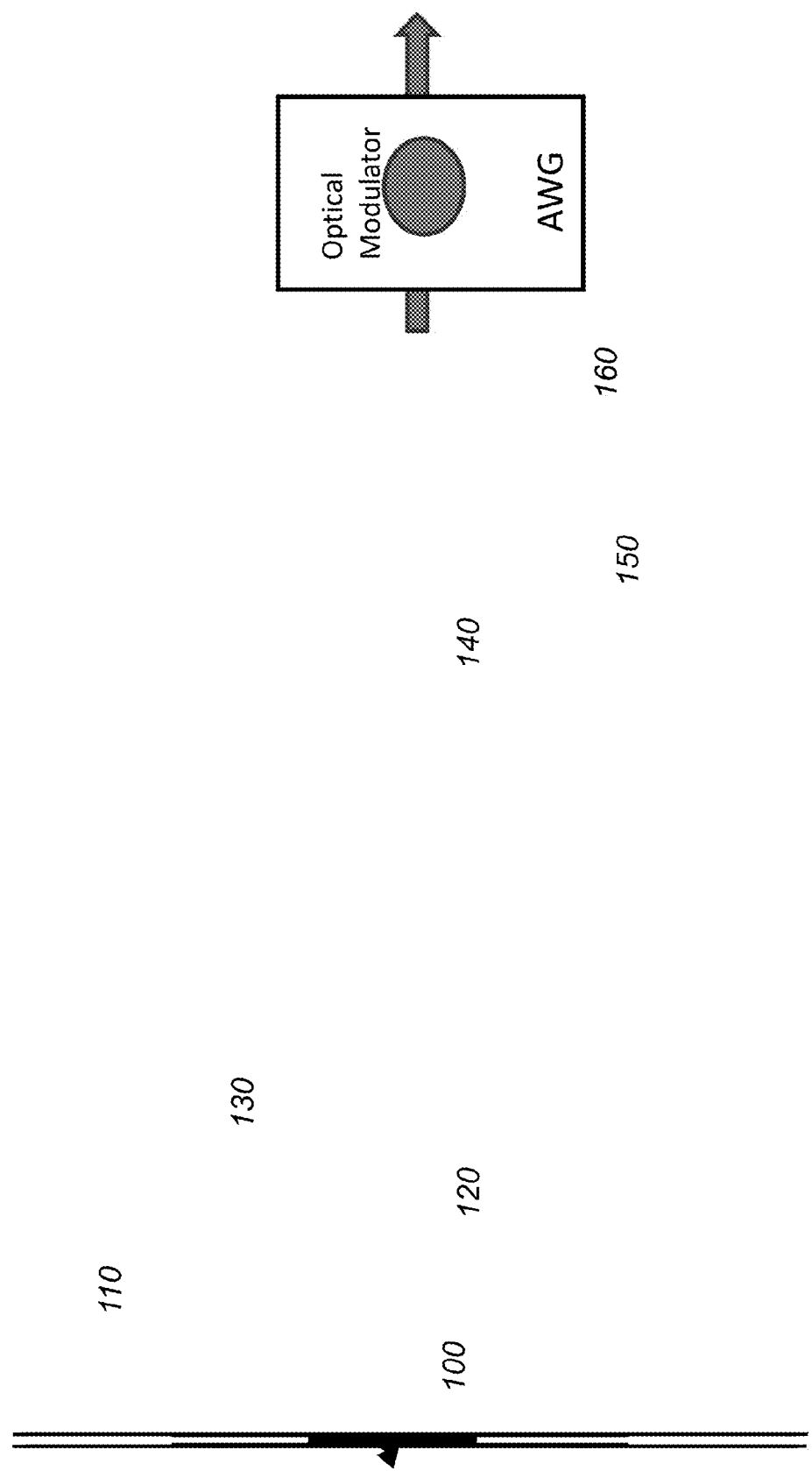
FIG. 2 shows an exemplary flow diagram of DBP using a frequency-shaped SSFM with block processing.
Figure 3:
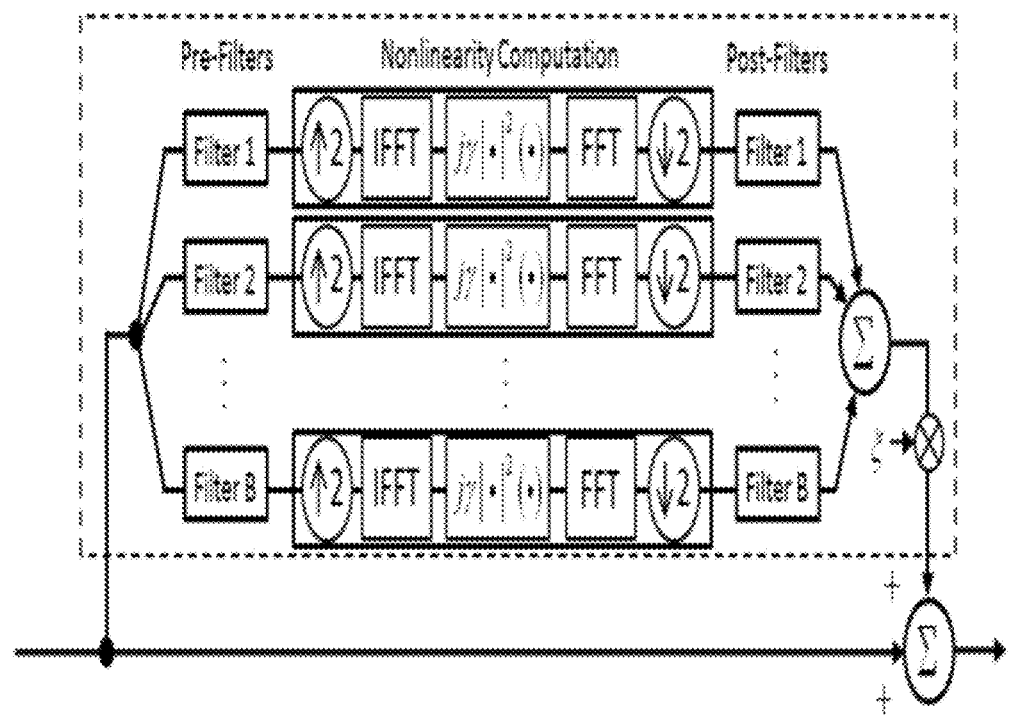
FIG. 3 shows an exemplary nonlinear step of the frequency-shaped SSFM.

FIGS. 2 and 3 show the architecture of a NLC employing DBP with FS-SSFM. FIG. 2 shows an exemplary flow diagram of DBP using a frequency-shaped SSFM with block processing. In FIG. 2, input data is processed using an over-lap-and-save algorithm with block size M and overlap factor of N samples between adjacent blocks, where M and N are optimized for the given dispersion map. Data block 100 with block size M is processed by an FFT block 110. In frequency-domain equalization (FDE), the fast Fourier transform (FFT) of the block is taken, followed by multiplication with a linear dispersion equalizer. This is done as linear half-step 120, followed by non-linear full step 130, followed by linear full step 140. This process is repeated until all data is processed, followed by the inverse FFT (IFFT) block 150. The output is save as data block 160 with block size M−N+1. As the concatenation of FFT→Equalizer→IFFT yields a circular convolution between the circular-extension of the signal represented by the block, and the equivalent time-domain signal represented by the FDE, only the portion of the output corresponding to the linear convolution is kept; the other samples are discarded. Alternatively, if the input data uses cyclic-prefix coding, e.g., as in orthogonal frequency-division multiplexing (OFDM), the system can replace the overlapping blocks with non-overlapping blocks, while all of the output samples are saved.

FIG. 3 shows an exemplary nonlinear step of the frequency-shaped SSFM. The operations performed by the nonlinear step in FS-SSFM are shown in FIG. 3. The input signal is an M×1 vector that is the frequency-domain output of the previous linear section (FIG. 2). The system multiplies this signal with B parallel pre-filters. To reduce aliasing by the nonlinear distortion signal, the system performs 2× upsampling (padding with zeros) before taking a 2M-point IFFT to obtain the time-domain signal. Nonlinearity was then computed sample-by-sample, $\hat{N}(.)=j\gamma|.|^2(.)$, followed by a 2M-point FFT to convert the signal back to the frequency-domain and down-sampling by two. The output signals are multiplied with B parallel post-filters and summed to obtain an overall estimate of for M digitized frequencies. Taking into account the overlap-and-save in FIG. 2, the algorithmic complexity of the nonlinear step is $$\frac{(4(2M)\log_2(2M) + 14M)B}{M - N + 1}$$

real multiplications per sample.

In the FS-SSFM-based DBP algorithm proposed, the single-step FDE is replaced by a concatenation of linear and nonlinear steps as shown in FIG. 2. In this multi-step architecture, the linear steps for dispersion compensation are identical to the FDE (with reduced dispersion at each step). The enhanced nonlinear step is as shown in FIG. 3. The components enclosed within the dotted box estimates the nonlinear distortion accumulated over step size $\Delta z$:

$$\int_{\Delta z} \hat{N}(z)E(z, t)dz.$$

This signal is summed with the through-signal to produce an output signal. The nonlinear distortion in the dotted box is a parallel structure of B paths. In each path, the M×1 input vector (frequency-domain output the linear step in FIG. 2) is multiplied with a frequency-shaping pre-filter, yielding a frequency-domain output of the same size M. To reduce the impact of aliasing, the system upsamples the signal by two by padding the vector with zero. To avoid aliasing, the system performs 2× upsampling (padding with zeros) before taking the 2M-point inverse Fourier transform (IFFT) to obtain the time-domain signal. This is followed by nonlinearity computation $\hat{N}(.)=j\gamma|.|^2(.)$, followed by a 2M-point FFT converting the signal back to the frequency-domain, followed by downsampling. This yields an output M×1 vector representing the nonlinear distortion. As the coefficients of the pre-filter in the i-th path were chosen to maximize the accuracy of the nonlinear computation around the frequency sub-band $\{M_i\}$ of interest, the system multiplies the outputs of the B-paths with B-post-filters and sums their outputs. This yields improved nonlinearity estimation compared with the standard frequency-flat SSFM. In contrast, previous implementations of DBP used frequency-flat SSFM, where the nonlinear distortion is computed without consideration for walkoff between frequency components. This is equivalent to using only one sub-band in FIG. 3.

Performance simulations show that (a) a multi-step architecture can dramatically improve performance; (b) a feed-forward structure is less sensitive to error propagation arising from decision errors and easier to implement; (c) by using the overlap-and-save architecture in FIG. 2, the process will work for single-carrier modulation formats as well as OFDM. The structure of the system of FIGS. 2-3 is more general due to (a) the use pre-filters before the nonlinearity computation, and (b) the partitioning of the nonlinear calculation into B parallel subbands.

Figure 4A:
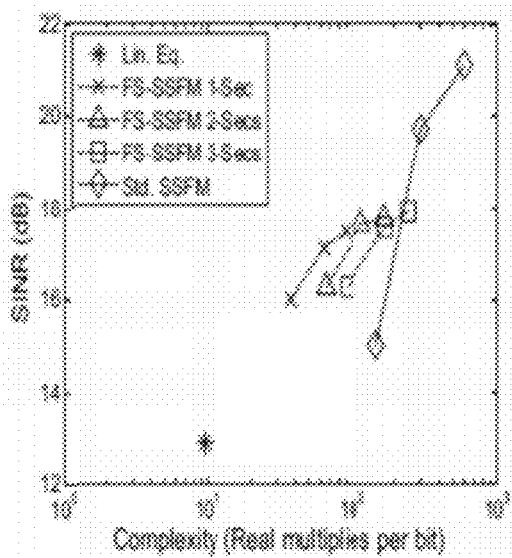
FIG. 4A-4B compares the tradeoff between performance and complexity for managed and unmanaged systems.
Figure 4B:
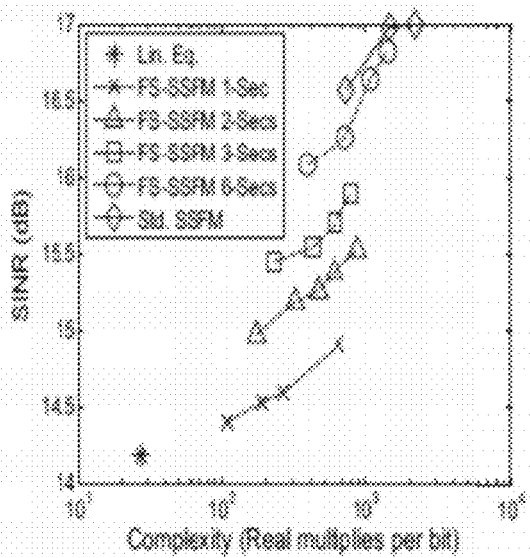

FIGS. 4A-4B compare the tradeoff between performance and complexity. The performance versus algorithmic complexity tradeoff is shown in FIG. 4A for dispersion managed OFDM-16QAM transmission over 12×80-km spans of SMF, and FIG. 4B showing dispersion unmanaged SC-16QAM over 24×80-km spans of NZ-DSF. The result shows SINR for standard SSFM with varying number of steps per fiber, and FS-SSFM with 1, 2 and 3 sections with varying number of sub-bands. The reference performance achieved by LE is also shown. It is observed that for the dispersion managed OFDM system, greater performance improvement is obtained by using one section and increasing the number of sub-bands. For the dispersion unmanaged system, it is better to divide the transmission link into larger number of sections but using only one sub-band in each section.

Figure 5A:
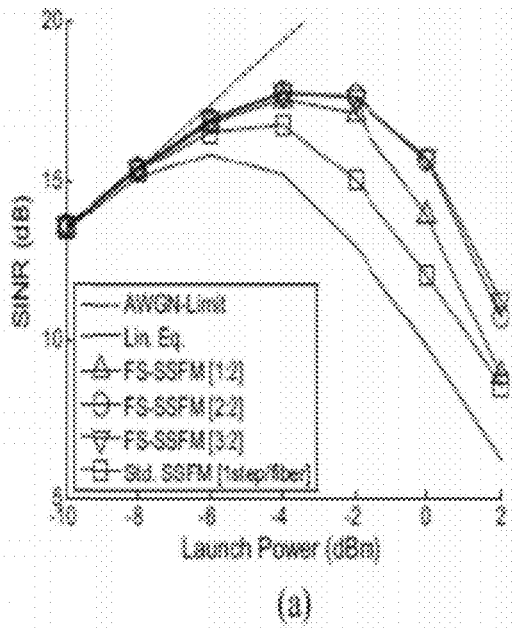
FIG. 5A-5B show the signal-to-interference-and-noise ratio (SINR) versus launch power for the two systems.
Figure 5B:
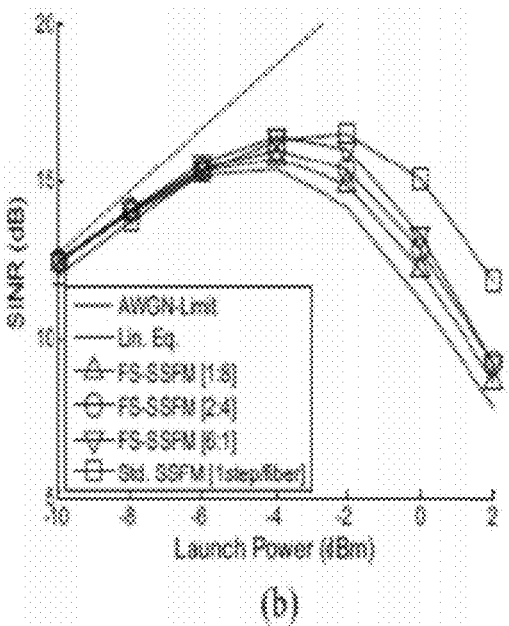

FIGS. 5A-5B show simulated performance of different nonlinear compensation algorithms for (a) dispersion managed OFDM-16QAM transmission over 12×80-km spans of SMF, and (b) dispersion unmanaged SC-16QAM over 24×80-km spans of NZ-DSF. FIG. 5A-5B show the signal-to-interference-and-noise ratio (SINR) versus launch power for the two systems, where in the additive white Gaussian noise (AWGN) limit, an SINR of 16.5 dB is required to obtain a bit-error rate (BER) of $10^{-3}$ for 16-QAM. The curves show results for linear equalization, standard SSFM using 1 step per fiber, and FS-SSFM [K:B] where K denotes the total number of steps used and B denotes the number of sub-bands. As expected, increasing either the number of steps or the number of sub-bands improved SINR at the expense of higher complexity. As complexity of FS-SSFM [K:B] is approximately 2K×B higher than linear equalization (LE), it is observed that even a modest increase in complexity can improve performance significantly; e.g., FS-SSFM [2:2] achieves 2 dB higher SINR than LE in the OFDM system, whereas FS-SSFM [2:4] achieves 1 dB higher SINR than LE in the second SC system.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A transmitter, comprising:
   a digital back-propagation (DBP) module with a frequency-shaped split-step Fourier method (FS-SSFM) to perform nonlinear compensation for optical data;
   a processor to generate a pre-distorted signal, wherein the nonlinear signal is generated by a parallel structure of paths and in each path, M×1 input vector is multiplied with a frequency-shaping pre-filter, yielding a frequency-domain output which is upsampled prior to taking a 2M-point inverse Fourier transform (IFFT) to obtain a time-domain signal; and
   one or more optical modulators transmitting the pre-distorted signal with arbitrary-waveform generators (AWG).

2. The transmitter of claim 1, wherein the processor processes a data block using an overlap-and-save method with a block size M and an overlap factor of N samples between adjacent blocks.

3. The transmitter of claim 1, wherein the processor implements a multi-step architecture and a feed forward processing structure to reduce error propagation arising from decision errors.

4. The transmitter of claim 1, comprising using an overlap-and-save architecture to support both single-carrier modulation formats and orthogonal frequency-division multiplexing (OFDM) formats.

* * * * *